UNITED STATES PATENT OFFICE.

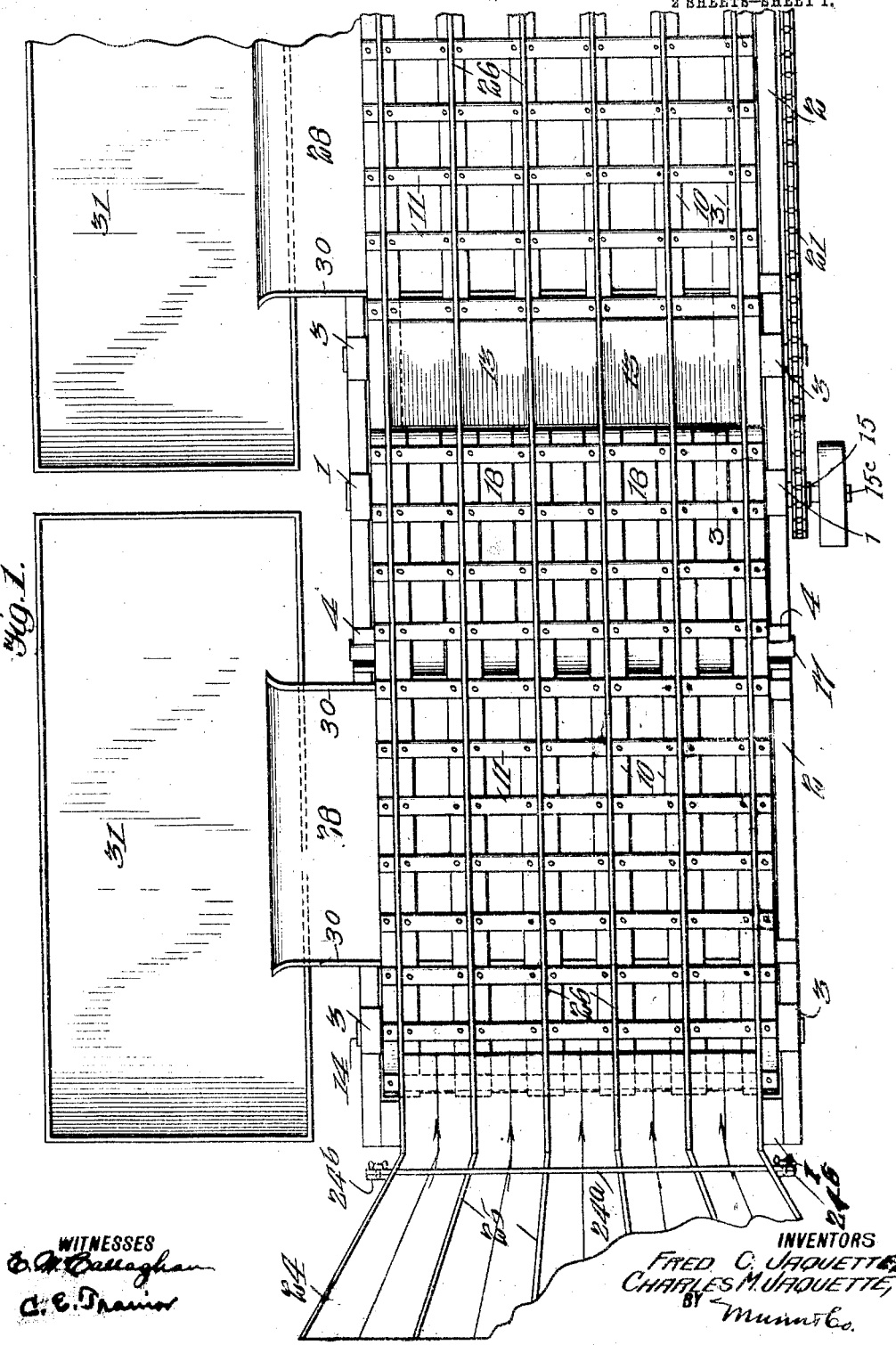

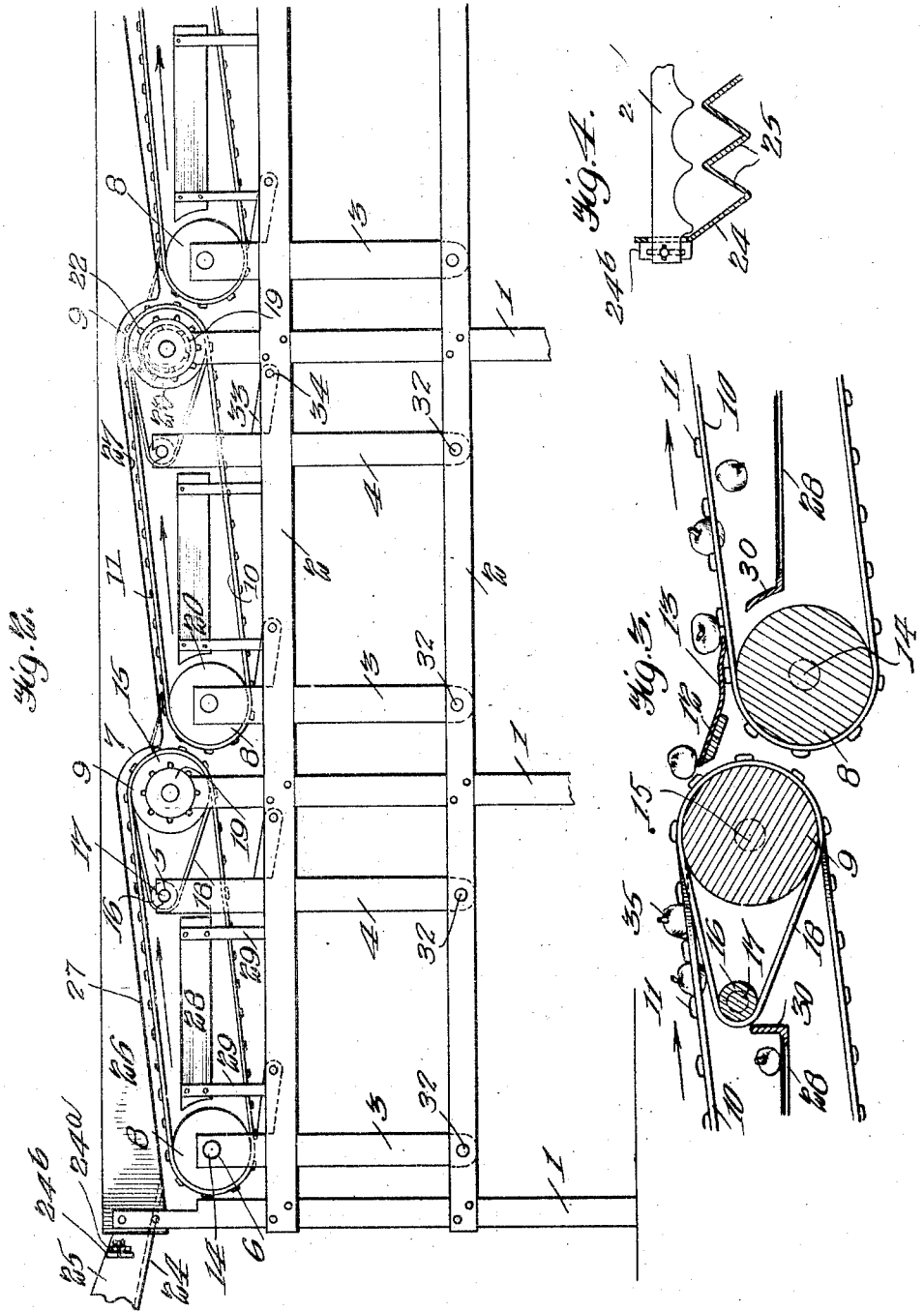

FRED C. JAQUETTE AND CHARLES M. JAQUETTE, OF GRAND JUNCTION, COLORADO; SAID CHARLES M. JAQUETTE ASSIGNOR TO SAID FRED C. JAQUETTE.

FRUIT-GRADER.

1,097,439.  Specification of Letters Patent.  Patented May 19, 1914.

Application filed June 26, 1913. Serial No. 774,807.

*To all whom it may concern:*

Be it known that we, FRED C. JAQUETTE and CHARLES M. JAQUETTE, citizens of the United States, and residents of Grand Junction, in the county of Mesa and State of Colorado, have made certain new and useful Improvements in Fruit-Graders, of which the following is a specification.

Our invention is an improvement in fruit graders, and has for its object to provide a grader of the character specified, especially adapted for grading fruit, as it is moved by endless carriers, and wherein a series of carriers is provided, each arranged to deliver from the machine all fruit below a certain size.

A further object is to provide mechanism for preventing injury to the fruit as it passes from one carrier to another.

In the drawings: Figure 1 is a top plan view of a portion of the improved grader. Fig. 2 is a partial side view, Fig. 3 is a detail sectional view on the line 3—3 of Fig. 1, and, Fig. 4 is a detail view of a portion of the check plate and its mounting.

The present embodiment of the invention consists of a frame composed of cheek plates consisting of uprights 1, and longitudinal connecting bars 2. A plurality of series of bearing plates 3 and 4 are connected with the respective cheek plates, the said bearing plates being arranged in vertical position and being supported by the bars 2. The plates 3 and 4 of each cheek plate of the frame register with the plates 3 and 4 of the other cheek plate. The plates 4 are alternately arranged with respect to the plates 3, and are of greater length, and each plate 4 is provided with an open bearing 5 at its upper end. Each of the plates 3 is also provided with a bearing 6 at its upper end, and the intermediate uprights 1 have similar bearings 7 at their upper ends, the said bearings being at approximately the same level as the bearings 5 of the plates 4. Rollers 8 are journaled in the bearings 6 of the bearing plates 3, and similar rollers 9 are journaled in the bearings 7 of the uprights 1.

Endless carriers are supported by each pair of rollers 8 and 9, each of the said carriers consisting of a series of endless belts 10 arranged in spaced relation, and connected by slats 11. The arrangement of the rollers 8 and 9 of each pair is such that the upper run of each carrier inclines upwardly from the roller 8 to the roller 9, and the carriers are so arranged that the upper or delivery end of each carrier delivers to the lower end of the succeeding carrier.

A cross bar 12 is arranged between the adjacent carriers, each cross bar having a deflecting plate 13 connected therewith. The cross bars 12 are arranged adjacent to the rollers 9, and the deflecting plate or apron 13 extends above the commencement of the upper run of the succeeding carrier as shown more particularly in Fig. 3. The rollers 8 and 9 are provided with trunnions 14 and 15 respectively for engaging the bearings 6 and 7 and a roller 16 of smaller diameter than the rollers 8 and 9 is journaled in each pair of plates 4. Each of the rollers 16 is provided with trunnions or journal pins 17 for engaging the bearings 5 of the plates 4. Each of the rollers 16 is connected to the adjacent roller 9, by means of a series of endless belts 18, the said belts being arranged between the belts 10. The upper run of each of the said belts 18 is spaced below the belts 10 at the roller 16, and the said upper run gradually comes into the plane of the belts 10, as the said belts 18 pass onto the rollers 9. That is the upper run of each of the said belts 18 is inclined with respect to the belts 10.

The first and second rollers 9 are provided with registering sprocket wheels 19, which are connected by a chain 21. The rollers 8 are driven by the endless carriers 10—11. The several carriers are driven at different speeds, each succeeding carrier traveling faster than the preceding. It will be evident that there are more openings to the square foot of surface in each carrier than in the succeeding carrier and unless the succeeding carrier travels faster than the preceding the fruit would pile up on the succeeding carrier. The sprocket wheel 19 of the second roller 9 is of smaller size than the said wheel of the first roller 9 so that the second carrier is driven at a higher speed than the first carrier. The second roller 9 is provided with a second sprocket wheel 22 on the same side as the sprocket wheel 19, and the said wheel 22 is adapted for engagement by a sprocket chain, not shown, to connect the said wheel 22 with a similar wheel of smaller size, on the third roller 9. The succeeding carriers are connected in similar manner, so that the said carriers travel as above specified.

The fruit is fed to the first carrier, by means of a feeding chute 24 flaring toward the end remote from the frame, and the upper face of the said chute is provided with a series of trough-shaped grooves or passages 25, in which the fruit travels. A check plate 24ª is arranged above the feeding chute, near the delivery end thereof, for preventing more than one member of the fruit from rolling onto the grading carrier at a time from each passage. The plate 24ª is mounted in guides 24ᵇ, and may be moved vertically for large or small size fruit. The passages 25 are V-shaped, and the under edge of the plate 24ª is recessed, as shown at each passage.

Strips 26 are arranged longitudinally of the carriers, above the upper runs thereof, and the under edges of the said strips are notched or recessed, as shown at 27, to follow the inclination of the upper runs of the grading carriers. The said strips 26 are arranged in alinement with the divisions between the passages 25 of the feed chute, so that the fruit as it is fed, is separated into a number of sub-divisions, five in the present instance and the fruit in each division remains separated from the fruit in the other subdivisions throughout its travel, or until it is discharged from the carriers.

Between each adjacent pair of rollers 8 and 16 a chute 28 is arranged, the said chute being supported at one end by standards 29 on the upper bar 2, and each of the said chutes 28 delivers at the opposite end from the standards 29 outside of the frame, as shown in Fig. 1. The said chutes 28 have flanges 30 at each side to prevent the escape of the fruit, and each chute delivers onto a packing table 31. A chute 28 is thus provided for each carrier, as is also a packing table 31.

It will be noted that one of the flanges of each chute 28, namely the one adjacent to the roller 8 is curved, so that the free edge thereof is adjacent to the free edge of the adjacent apron 13. As many carriers may be used as may be desired or necessary, and the grading device may be driven by any suitable form of motor. The belts 10 are of suitable material and are from one and one-half to two and one-half inches in width, and are placed at different distances from each other in the various carriers. As for instance in the first carrier, the belts are spaced at intervals of two and one-fourth inches, and in the succeeding carriers they are spaced at intervals of two and one-half, two and three-fourths, and three inches respectively.

As a rule four carriers are made use of. The slats 11 are preferably of wood, and are one and one-fourth inches in width, but it is evident that they may be of metal or even of belting if desired. The slats are spaced at the same intervals in the respective carriers as the belts, so that in each carrier perforations or openings of equal size are provided. The bearing plates 3 and 4 are pivoted to the lowermost bar 1, as indicated at 32, and each bearing plate is engaged at its upper end by an adjusting arm 33, pivoted to the uppermost bearing plate, as indicated at 34. The said arms hold the upper ends of the bearing plates 3 and 4 properly spaced with respect to the rollers 9, and by pressing the free ends of the said arms downward, the belts of the carriers and the belts 18 may be tightened.

The fruit 35 to be graded, as for instance apples, is fed onto the feed chute 24, and rolls down the same on to the slats and belts of the first carrier. It will be noted from an inspection of Fig. 1, that the spacing or dividing strips 26 are arranged directly above the longitudinal center of the belts 10, so that the openings of the carriers are between the adjacent strips. As the fruit passes onto the first carrier, all of the said fruit that is below a certain predetermined size, namely of less diameter than the width of the openings between the belts, and the slats, will fall through the said openings onto the delivering chute 28 beneath the upper run of the said carrier. The said chutes are arranged between the runs of the carriers, and they are of such width, that they extend between the rollers 8 and 16. All of the fruit that passes through the first belt will be delivered to the first packing table 31. All of the fruit that is above the size of the opening of the first carrier will be delivered to the succeeding carrier, and the upper runs of the belts 18 will gradually raise all of the fruit above the level of the lower surface of the belts 10 before the said fruit reaches the roller 9.

The endless belts 18 are for the purpose of raising the fruit from between the slats, as shown in Fig. 3. Thus apples for instance that are of but slightly greater size than the openings of the first carrier will partially pass through the said openings, and the said apples might be injured were there no means provided for releasing them from this position before they engage the roller 9. When the fruit passes onto the second carrier, all of the fruit that is of less diameter than the width of the openings of the said second plate will drop through and the process will be continued until the grading is completed.

With the openings spaced as above mentioned, apples below two and one-fourth inches in diameter will be delivered to the first packing table. Apples below two and one-half inches in diameter will be delivered to the second table, apples below two and three-fourths inches in diameter will be delivered to the third table, and below three inches in diameter will be delivered to the fourth table. All apples above three inches in diameter should there be any of this size, will be delivered at the end of the last carrier.

As the fruit passes from each carrier to the succeeding carrier, it is delivered onto the apron 13, and each of the said aprons is inclined so that the fruit will slide down the same onto the upper run of the succeeding carrier at the lower end thereof. The delivering chutes 28 incline downwardly toward the packing tables so that the fruit will travel of its weight.

The grader may be operated in any suitable manner and from any suitable source of power, as for instance by means of a belt connecting the source of power with a pulley 15° on the shaft of the first roller 9.

We claim:—

1. In a fruit grading machine comprising a supporting frame, the combination of endless carriers for grading the fruit, said carriers being arranged in succession and with each carrier inclining upwardly from its receiving to its delivery end, the receiving end of each of the succeeding carriers being at a lower level and adjacent to the delivery end of the preceding carrier, each of the said carriers comprising a series of endless belts arranged in regular spaced relation, and transverse slats connecting the belts and spaced apart at the same distance from each other as the spacing of the belts, the belts of the several carriers being in alinement longitudinally of the frame, and a separating strip arranged above the center of each line of belts, the lower edge of each of the strips being shaped to correspond with the inclination of the carriers and the said lower edge of each strip being adjacent to the upper surface of all of the carriers, the openings of each carrier being of substantially the same size and of larger size than the openings of the preceding carrier.

2. A carrier having a series of rows of longitudinally extending openings of equal size, and means at the delivery end of each carrier for gradually lifting the material carried by the carrier to the plane of the upper run of the carrier, said means comprising endless belts supported at the delivery end of the carrier, one of the said belts being arranged in alinement with each series of openings and with its upper run inclining upwardly to a level with the upper face of the carrier at the delivery end thereof.

3. In a fruit grading machine, a feed chute having a series of longitudinally extending passages arranged alongside each other, each passage being V-shaped in cross section, and means in connection with the chute for gaging the size of fruit that may pass through the passages, said means comprising a plate arranged transversely of the chute near its delivery end, a support for the plate, the plate being adjustable on the support, said plate having its lower edge recessed at each passage.

FRED C. JAQUETTE.
CHAS. M. JAQUETTE.

Witnesses:
ALVIN E. BORSCHELL,
STERLING B. LACY.